(12) United States Patent
Niu

(10) Patent No.: US 10,021,752 B2
(45) Date of Patent: Jul. 10, 2018

(54) LIGHTING METHOD AND LIGHTING DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Zirui Niu, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 15/304,707

(22) PCT Filed: Jan. 21, 2016

(86) PCT No.: PCT/CN2016/071614
§ 371 (c)(1),
(2) Date: Oct. 17, 2016

(87) PCT Pub. No.: WO2017/036071
PCT Pub. Date: Mar. 9, 2017

(65) Prior Publication Data
US 2017/0273156 A1    Sep. 21, 2017

(30) Foreign Application Priority Data

Aug. 28, 2015 (CN) .......................... 2015 1 0543971

(51) Int. Cl.
*F21V 21/14* (2006.01)
*H05B 33/08* (2006.01)
(Continued)

(52) U.S. Cl.
CPC ............ *H05B 33/0872* (2013.01); *F21S 8/08* (2013.01); *F21V 9/08* (2013.01); *F21V 21/14* (2013.01);
(Continued)

(58) Field of Classification Search
CPC .... H05B 33/02; H05B 33/08; H05B 33/0803; H05B 33/0842; H05B 33/0854; H05B 33/0872; F21V 14/00; F21V 21/14
See application file for complete search history.

(56) References Cited

U.S. PATENT DOCUMENTS 5,838,860 A * 11/1998 Kingstone ............... F21V 29/74
385/100
8,002,438 B2 * 8/2011 Ko ........................ F21V 17/107
362/249.02
(Continued)

FOREIGN PATENT DOCUMENTS

CN          101535890 A       9/2009
CN          202040636 U       11/2011
(Continued)

OTHER PUBLICATIONS

First Office Action for Chinese Application No. 201510543971.5, dated May 2, 2017, 8 Pages.
(Continued)

*Primary Examiner* — Jason M Crawford
(74) *Attorney, Agent, or Firm* — Brooks Kushman P.C.

(57) ABSTRACT

The present disclosure relates to a lighting method and a lighting device and belongs to the field of lighting technology. The method includes acquiring environment information about a lighting device, where the environment information indicates environment features about the lighting device; acquiring a target light parameter corresponding to the environment information about the lighting device based
(Continued)

on a predetermined correspondence between environment information and light parameters, where the target light parameter includes at least one of light color, color temperature and light-emitting power; and controlling the lighting device to emit light corresponding to the target light parameter based on the target light parameter.

18 Claims, 3 Drawing Sheets

(51) Int. Cl.
    *H05B 37/02*         (2006.01)
    *F21V 9/08*          (2018.01)
    *F21S 8/08*          (2006.01)
    *F21Y 115/10*       (2016.01)
(52) U.S. Cl.
    CPC ...... *H05B 37/0236* (2013.01); *F21Y 2115/10* (2016.08)

(56) References Cited

U.S. PATENT DOCUMENTS

| | | | | |
|---|---|---|---|---|
| 2005/0225264 A1* | 10/2005 | Kemp | ............... | H05B 33/0818 315/291 |
| 2006/0262544 A1* | 11/2006 | Piepgras | ............... | F21K 9/00 362/373 |
| 2006/0278816 A1* | 12/2006 | Booty | ............... | F21S 6/003 250/221 |
| 2008/0049346 A1* | 2/2008 | Cusick | ............... | G02B 26/008 359/891 |
| 2008/0091250 A1* | 4/2008 | Powell | ............... | A61M 21/00 607/90 |
| 2008/0122821 A1 | 5/2008 | Nilsson et al. | | |
| 2009/0154148 A1* | 6/2009 | Meyer | ............... | F21L 2/00 362/157 |
| 2009/0268458 A1* | 10/2009 | Feinbloom | ............... | F21V 14/06 362/240 |
| 2011/0141725 A1* | 6/2011 | Brusilovsky | ............ | F21S 6/003 362/231 |
| 2012/0140433 A1* | 6/2012 | Armer | ............... | G03B 15/02 362/6 |
| 2013/0094219 A1* | 4/2013 | Jurik | ............... | F21S 10/007 362/322 |
| 2014/0015775 A1* | 1/2014 | Wu | ............... | G06F 3/041 345/173 |
| 2014/0168985 A1* | 6/2014 | Chien | ............... | F21S 8/035 362/253 |
| 2014/0185285 A1* | 7/2014 | Jorgensen | ............... | F21V 14/02 362/232 |
| 2015/0015775 A1* | 1/2015 | Nagata | ............... | H04N 5/2351 348/370 |
| 2015/0351169 A1* | 12/2015 | Pope | ............... | H05B 33/086 315/193 |
| 2016/0286616 A1* | 9/2016 | van de Ven | ........ | H05B 33/0842 |
| 2016/0334069 A1* | 11/2016 | Ji | ............... | H05B 37/0218 |

FOREIGN PATENT DOCUMENTS

| | | |
|---|---|---|
| CN | 203586071 U | 5/2014 |
| CN | 204157094 U | 2/2015 |
| CN | 105163435 A | 12/2015 |
| EP | 2498581 A2 | 9/2012 |
| WO | 2010070517 A1 | 6/2010 |

OTHER PUBLICATIONS

International Search Report and Written Opinion for Application No. PCT/CN2016/071614, dated May 9, 2016, 8 Pages.
Second Office Action for Chinese Application No. 201510543971.5, dated Aug. 2, 2017, 6 Pages.

* cited by examiner

US 10,021,752 B2

LIGHTING METHOD AND LIGHTING DEVICE

CROSS-REFERENCE TO RELATED APPLICATIONS

This application is the U.S. national phase of PCT Application No. PCT/CN2016/071614 filed on Jan. 21, 2016, which claims priority to Chinese Patent Application No. 201510543971.5 filed on Aug. 28, 2015, the disclosures of which are incorporated in their entirety by reference herein.

TECHNICAL FIELD

The present disclosure relates to the field of lighting technology, and in particular to a lighting method and a lighting device.

BACKGROUND

Currently, in daily life, work and production, a variety of lighting devices are necessary, which can create good visibility and pleasant environments.

There is a kind of lighting device in the related art, which lighting device comprises light-emitting components capable of emitting light of a plurality of colors and buttons for selecting light colors. The user can select the light color by pressing the corresponding button, thereafter the lighting device will emit light of the color selected by the user.

During the implementation of the present disclosure, the inventor has found at least the existing defect that the operations when the lighting device changes the light color are too complicated.

SUMMARY

In order to solve the problem in the related art that the operations when the lighting device changes the light color are too complicated, the disclosed embodiments provide a lighting method and a lighting device. The technical solution is as follows.

In a first aspect of the disclosed embodiment, a lighting method is provided, including:

acquiring environment information about a lighting device, where the environment information indicates environment features about the lighting device;

acquiring a target light parameter corresponding to the environment information about the lighting device based on a predetermined correspondence between environment information and light parameters, where the target light parameter includes at least one of light color, color temperature and light-emitting power; and controlling the lighting device to emit light based on the target light parameter.

Optionally, the environment information includes image information, the predetermined correspondence between environment information and light parameters includes a predetermined correspondence between hues and light parameters, and the step of acquiring a target light parameter corresponding to the environment information about the lighting device based on a predetermined correspondence between environment information and light parameters includes:

acquiring a hue of the image information; and acquiring a target light parameter corresponding to the hue based on the predetermined correspondence between hues and light parameters.

Optionally, the environment information includes sound information, the predetermined correspondence between environment information and light parameters includes a predetermined correspondence between timbres and light parameters, and the step of acquiring a target light parameter corresponding to the environment information about the lighting device based on a predetermined correspondence between environment information and light parameters includes:

acquiring a timbre of the sound information; and acquiring a target light parameter corresponding to the timbre based on the predetermined correspondence between timbres and light parameters.

In a second aspect of the present disclosure, a lighting device is provided, including:

a light-emitting component and an environment information acquisition component;

the light-emitting component is electrically connected to the environment information acquisition component, the environment information acquisition component is configured to acquire environment information about the lighting device, where the environment information indicates environment features about the lighting device;

the light-emitting component is configured to emit light corresponding to the target light parameter based on the predetermined correspondence between environment information and light parameters, where the light parameter includes at least one of light color, color temperature and light-emitting power.

Optionally, the environment information acquisition component includes an image acquisition apparatus configured to acquire image information about the lighting device.

Optionally, the image acquisition apparatus is a camera.

Optionally, the environment information acquisition component includes a sound acquisition apparatus configured to acquire sound information about the lighting device.

Optionally, the sound acquisition apparatus is a microphone.

Optionally, the lighting device further includes a support and a base.

The support is arranged on the base;

the light-emitting component and the environment information acquisition component are arranged on the support.

Optionally, a rotating component is arranged on the support, configured to drive the light-emitting component to rotate.

Optionally, the light-emitting component includes light-emitting diodes and a color filter plate, where light emitted by the light-emitting component is light emitted by the light-emitting diodes and transmitting through the color filter plate.

Optionally, the support includes a first part and a second part; the light-emitting component is arranged on the first part of the support, and the base is arranged on the second part of the support; the first part of the support is rotatably connected to the second part thereof via the rotating component.

Optionally, the light-emitting component further includes a switching component, and the color filter plate includes a plurality of color filter sub-plates of different colors arranged on the switching component.

Optionally, the switching component includes a rotating shaft, the color filter sub-plates of different colors are arranged about the rotating shaft, and each of the color filter sub-plates is connected to the rotating shaft via a connecting mechanism, and a direction of the light emitted by the light-emitting diode is in parallel with a length direction of the rotating shaft.

Optionally, the light-emitting component further includes a lamp plate, and the light-emitting diodes are arranged on the lamp plate.

Optionally, the lamp plate is an aluminium-based plate.

Optionally, the color filter plate is a colored glass plate.

The technical solution provided in the disclosed embodiment may include the following advantageous effects.

By acquiring the environment information surround the lighting device, and by automatically changing the light parameter of light emitted by the lighting device based on the environment Information, the problem in the related art that the operations when the lighting device changes the light color are too complicated is solved, achieving the effect that the lighting device is capable of automatically changing light parameters based on the environment information.

It should be understood that both the foregoing general description and the following description in details are exemplary and explanatory only and do not to limit the disclosure.

BRIEF DESCRIPTION OF THE DRAWINGS

Drawings herein are incorporated in and constitute a part of this description, illustrate embodiments in compliance with the present disclosure, and together with the description, serve to explain the principles of the present disclosure.

FIG. 4-1 is a schematic view of a lighting device in some embodiments of the present disclosure;

FIG. 4-2 is a schematic view of a lighting device in some embodiments of the present disclosure;

FIG. 4-3 is a schematic view of a light-emitting component in the lighting device provided in the embodiment shown in FIG. 4-2.

With the above figures, explicit embodiments of the present disclosure have been shown, and will be hereinafter described in more details. These figures and written description are not intended in any way to limit the disclosed concept, but by reference to specific embodiments to illustrate the concept of the present disclosure to those skilled in the art.

DETAILED DESCRIPTION

Exemplary embodiments shown in the accompanying drawings will be described herein in detail. When the following description refers to the accompanying drawings, unless otherwise explicitly indicated, the same numerals in different figures denote the same or similar elements. The following exemplary embodiments described do not represent all the embodiments consistent with the present disclosure. Instead, they are only examples of devices and methods consistent with some aspects of the present disclosure as specified in the attached claims.

Figure 1:
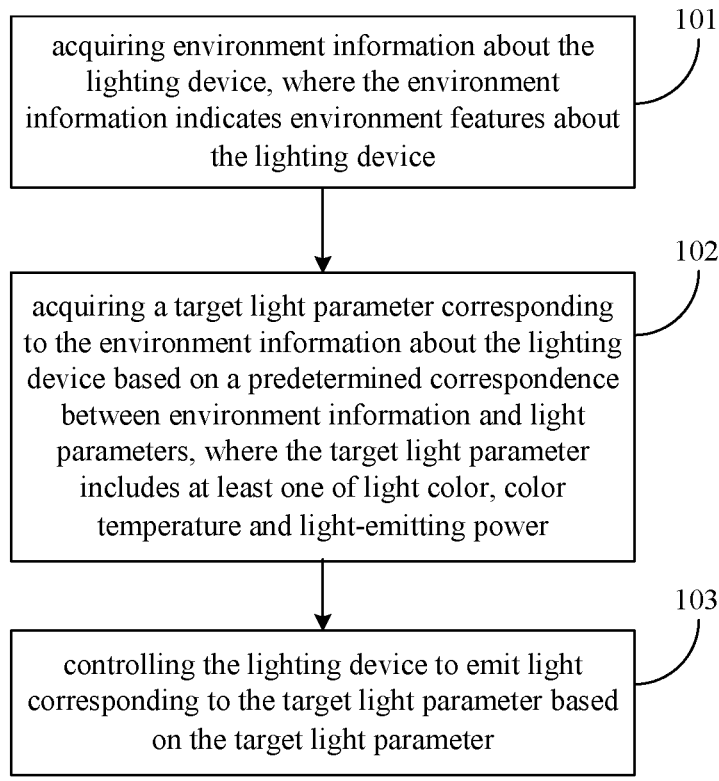
FIG. 1 is a flowchart of a lighting method in some embodiments of the present disclosure.

FIG. 1 is a flowchart of a lighting method in some embodiments of the present disclosure. The embodiment is described by way of taking example that a lighting method is applied to a lighting device. The lighting method may include the following steps:

Step 101: acquiring environment information about the lighting device, where the environment information indicates environment features about the lighting device;

Step 102: acquiring a target light parameter corresponding to the environment information about the lighting device based on a predetermined correspondence between environment information and light parameters, where the target light parameter includes at least one of light color, color temperature and light-emitting power;

Step 103: controlling the lighting device to emit light corresponding to the target light parameter based on the target light parameter.

From the above, the lighting method provided in some embodiments of the present disclosure solves the problem in the related art that the operations when the light color is changed are too complicated, by acquiring environment information about the lighting device and automatically changing the light parameter of light emitted by the lighting device based on the environment information, achieving the effect that the lighting device can automatically change the light parameter based on the environment information.

Figure 2:
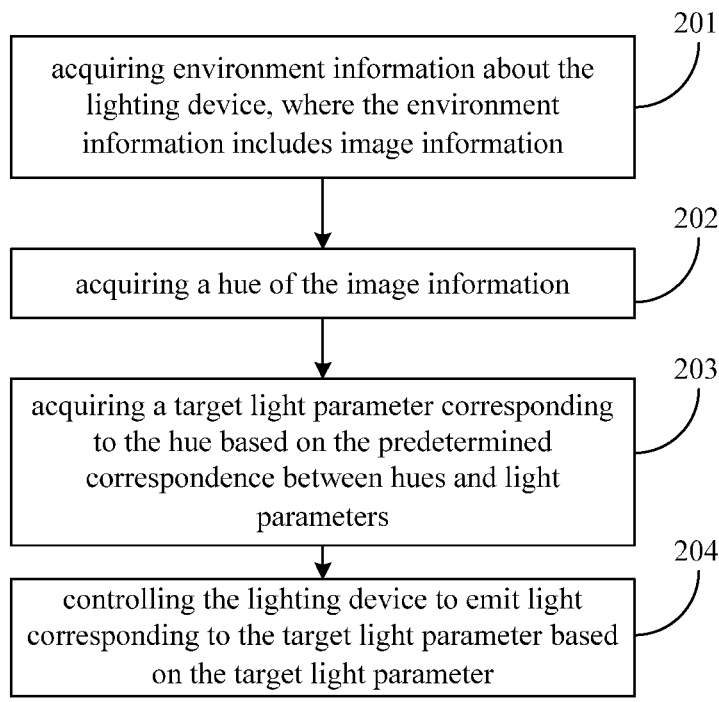
FIG. 2 is a flowchart of a lighting method in some embodiments of the present disclosure.

FIG. 2 is a flowchart of a lighting method in some embodiments of the present disclosure. The embodiment is described by way of taking example that the lighting method is applied to the lighting device. The lighting method may include the following steps:

Step 201: acquiring environment information about the lighting device, where the environment information includes image information.

According to the lighting method in some embodiments of the present disclosure, the lighting device may first acquire the environment information about the lighting device, where the environment information may include image information about the lighting device. For example, the lighting device may be installed with a camera, and the lighting device may acquire the image information of the about environment through the camera.

Step 202: acquiring a hue of the image information.

After acquiring the image information of the about environment, the lighting device may analyze the image information, so as to obtain the hue of the image information. The hue refers to the overall tendency of picture color in an image, and the lighting device may identify the hue of the image information through a Hypertext Preprocessor (PHP), specifically referring to the related art, and this will not be defined in the disclosed embodiments.

Step 203: acquiring a target light parameter corresponding to the hue based on the predetermined correspondence between hues and light parameters.

After acquiring the hue, the lighting device may acquire the target light parameter corresponding to the hue based on the predetermined correspondence between hues and light parameters, where the target light parameter may include at least one of light color, color temperature and light-emitting power. For example, the correspondence between hues and light parameters may be as shown in Table 1.

TABLE 1

| | | Light Parameter | |
| --- | --- | --- | --- |
| Hue | Light Color | Color Temperature | Light-emitting Power |
| Bluish | Blue | 2000 k | 300 mw |
| Reddish | Green | 5000 k | 500 mw |

In Table 1, the first column on the left is a hue column, and the other three columns are light parameter columns, respectively, a light color column, a color temperature column and a light-emitting power column, where the unit of color temperature is Kelvin (k), the unit of light-emitting power is milliwatt (mw). The lighting device can acquire the light parameter corresponding to the hue of the image information based on the table. For example, the hue of the image information is bluish, and it can be learned from Table 1 that the target light parameter corresponding to the hue is "blue, 2000 k, 300 mw".

Step 204: controlling the lighting device to emit light corresponding to the target light parameter based on the target light parameter.

After the lighting device acquires the target light parameter, the lighting device may emit light corresponding to the target light parameter through a light-emitting diode (LED).

It should be noted that the light-emitting device may also acquire other parameters of the image information, and emit light in compliance with the target light parameter based on the correspondence between other parameters and light parameters, which is not limited herein.

It should be noted that, the lighting method provided in some embodiments of the present disclosure may be applied to the lighting during the detection of the lighting device. In the manufacturing process of the display device, it is generally required to detect various components of the display device, while light colors required for the detection of different components may be different. For example, white light is required for detecting a film sheet, green light is required for detecting the backlight source not assembled completely, and green light is required for detecting the product of the backlight source. The entire detection process requires switching light color multiple times and the operations are very cumbersome. The use of the lighting method provided in some embodiments of the present disclosure may set the correspondence between hues and light parameters based on the hue of the component to be detected and the light color required for detecting the component, and it is only required to align the image acquisition component (such as a camera) of the lighting device with the component to be detected that the lighting device may automatically change the light color, greatly reduce the workload of the detection personnel, and improve work efficiency.

It should be noted that, according to the lighting method in some embodiments of the present disclosure, the target light parameter is acquired based on the image information of the about environment of the lighting device, and the lighting device is controlled to emit light corresponding to the target light parameter, such that the lighting device can change the light parameter of light emitted based on the image information of the about environment.

From the above, according to the lighting method in some embodiments of the present disclosure, by acquiring environment information about the lighting device and automatically changing the light parameter of light emitted by the lighting device based on the environment information, the problem in the related art, namely the process of changing the color of the light is too complicated, is solved, so that the lighting device can automatically change the light parameter based on the environment information.

Figure 3:
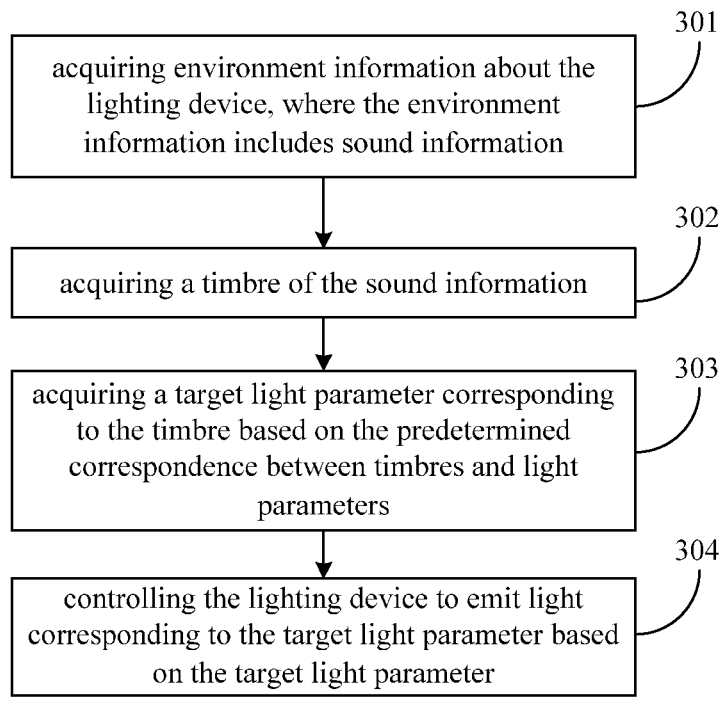
FIG. 3 is a flowchart of a lighting method in some embodiments of the present disclosure.

FIG. 3 is a flowchart of a lighting method in some embodiments of the present disclosure. The embodiment is described by way of taking example that the lighting method is applied to the lighting device. The lighting method may include the following steps:

Step 301: acquiring environment information about the lighting device, where the environment information includes sound information.

When the lighting method provided in some embodiments of the present disclosure is used, the lighting device may first acquire the environment information about the lighting device and the environment information may comprise sound information about the lighting device. Exemplarily, the lighting device may be installed with a microphone, and the lighting device may acquire the sound information of the about environment through the microphone.

Step 302: acquiring a timbre of the sound information.

After the lighting device acquires the sound information of the about environment, it may analyze the sound information to acquire timbre of the sound information. Wherein timbre refers to feeling features of sound. Different voices and different sounds may be distinguished into different timbres. The lighting device may use standard timbre function chart and predetermined timbre bank (storing a variety of timbre parameters) to acquire timbre of the sound information, specifically referring to the related art, and this will not be specified in the disclosed embodiments.

Step 303: acquiring a target light parameter corresponding to the timbre based on the predetermined correspondence between timbres and light parameters.

After the lighting device acquires timbre of the sound information, it may acquire the target light parameter corresponding to the timbre based on the predetermined correspondence between timbre and light parameter. For example, the lighting device may pre-store timbre parameters of a plurality of timbres, and wherein each of the timbres corresponds to one light parameter, and the light device may acquire the target light parameter based on the correspondence.

Step 304: controlling the lighting device to emit light corresponding to the target light parameter based on the target light parameter.

After the lighting device acquires the target light parameter, it may emit light in compliance with the target light parameter. The lighting device may emit light in compliance with the target light parameter through the light-emitting diode.

It should be noted that the lighting device may also establish a correspondence between parameters of other sound information and light parameter, such as a correspondence between frequency, language or loudness and light parameter, and the lighting device may emit light in compliance with the light parameter based on these parameters in the sound information.

According to the lighting method provided in some embodiments of the present disclosure, the lighting device may change the light parameter of light emitted based on the sound information of the about environment. When there is music playing near the lighting device, the lighting device may change the light parameter of light emitted based on the change in the music, without the user's operation or setting in advance, thereby improving the user experience.

It should be noted that, according to the lighting method provided in some embodiments of the present disclosure, the target light parameter is acquired based on the sound information of the about environment of the lighting device, and the lighting device is controlled to emit light corresponding to the target light parameter, so that the lighting device can change the light parameter of light emitted based on the sound information of the about environment.

From the above, according to the lighting method provided in some embodiments of the present disclosure, by acquiring environment information about the lighting device and automatically changing the light parameter of light emitted by the lighting device based on the environment information, the problem in the related art, namely the process of changing the color of the light is too complicated, is solved, so that the lighting device can automatically change the light parameter based on the environment information.

The following is an embodiment of the device of the present disclosure which may be used to perform the method embodiment of the present disclosure. For details in the device embodiment of the present disclosure not revealed, please refer to the method embodiment of the present disclosure.

Figures 1, 4:
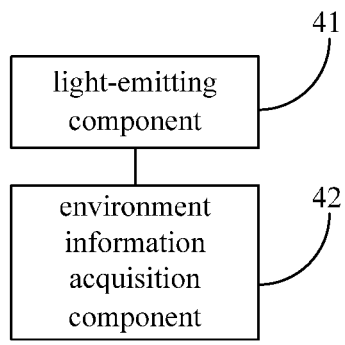
Figures 2, 4:
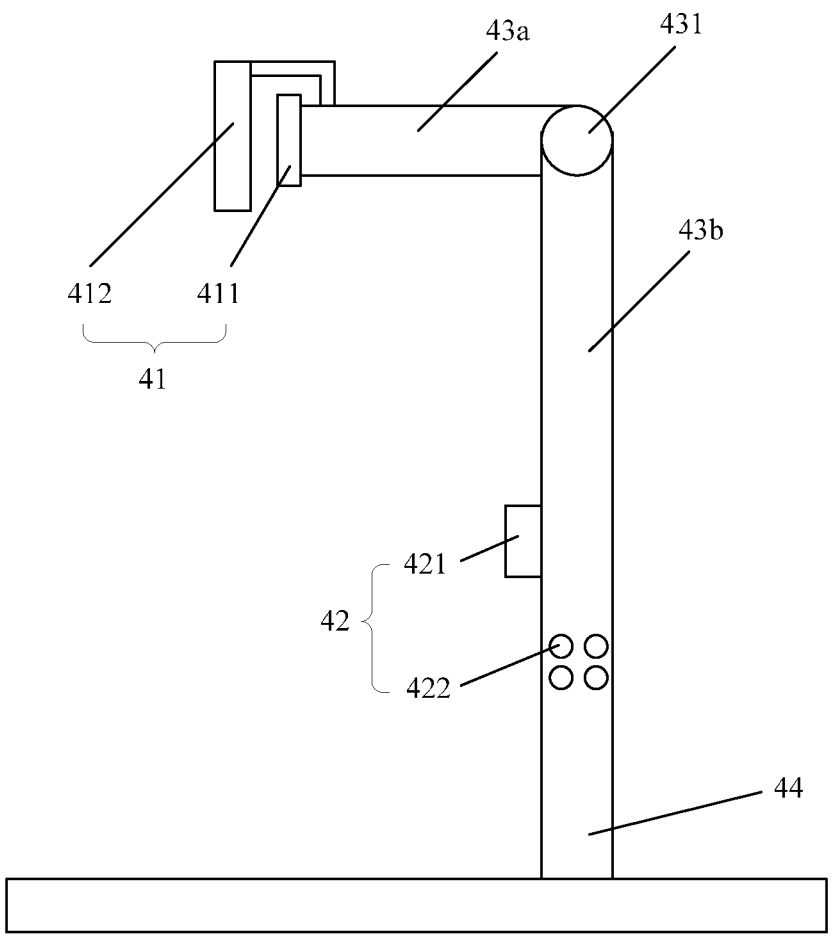
Figures 3, 4:
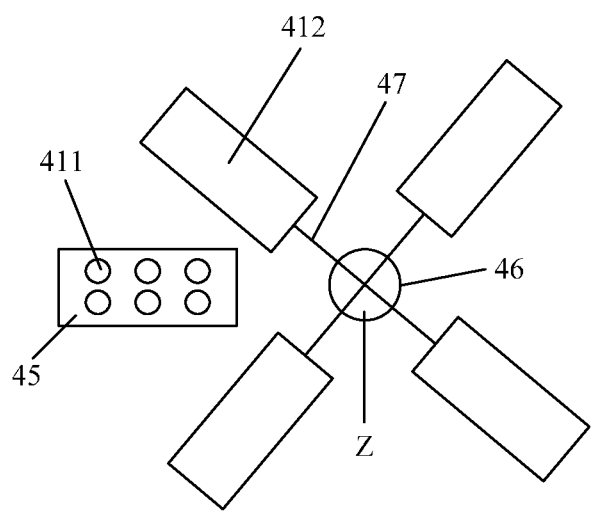

FIG. 4-1 is a schematic view of a lighting device shown in some embodiments of the present disclosure. The lighting device may include:

a light-emitting component 41 and an environment information acquisition component 42.

The light-emitting component 41 is electrically connected to the environment information acquisition component 42, the environment information acquisition component 42 is configured to acquire environment information about the lighting device, and the environment information indicates environment features about the lighting device.

The light-emitting component 41 can emit light in compliance with the target light parameter corresponding to the environment information about the lighting device based on the predetermined correspondence between the environment information and the light parameters, and the light parameter includes at least one of light color, color temperature and light-emitting power.

From the above, according to the lighting device provided in some embodiments of the present disclosure, by acquiring environment information about the lighting device and automatically changing the light parameter of light emitted by the lighting device based on the environment information, the problem in the related art, namely the process of changing the color of the light is too complicated, is solved, so that the lighting device can automatically change the light parameter based on the environment information.

Optionally, the environment information acquisition component 42 includes an image acquisition apparatus 421 configured to acquire image information about the lighting device.

Optionally, the image acquisition apparatus 421 is a camera.

Optionally, the environment information acquisition component 42 includes a sound acquisition apparatus 422 configured to acquire sound information about the lighting device.

Optionally, the sound acquisition apparatus 422 is a microphone.

Optionally, the lighting device further include a support 43 and a base 44, where the support 43 is arranged on the base 44, and the base 44 may be a steel base.

The light-emitting component 41 and the environment information acquisition component 42 are arranged on the support 43. The support 43 may be a hollow support, where the hollow part may be used to accommodate a circuit to connect respective electronic components in the lighting device, such as the light-emitting component 41 and the environment information acquisition component 42.

Optionally, the support 43 is provided with a rotating component 431 configured to drive the light-emitting component 41 to rotate. The support 43 includes a first part 43a and a second part 43b, and the first part 43a is rotatably connected to the second part 43b. The first part 43a is provided with the light-emitting component 41, and the second part 43b is provided with the base 44.

Optionally, the light-emitting component 41 includes light-emitting diodes 411 and a color filter plate 412, light emitted by the light-emitting component 41 is the light emitted by the light-emitting diodes 411 and transmitting through the color filter plate 412. There may be 12 light-emitting diodes 411, the light-emitting component 41 may further include a lamp plate 45, and the 12 light-emitting diodes 411 may be arranged on the lamp plate 45. Optionally, the aluminum plate 45 is an aluminous plate. The color filter plate 412 may be made of colored glass. The color filter plate 412 may include sub color filter plates of different colors arranged on an switching component 46. The switching component 46 may change the color filter plate irradiated by the light-emitting diode 411 to change the light color of light emitted. For example, as shown in FIG. 4-3, the switching component 46 may include a rotating shaft Z, the color filter plates 412 of different colors are arranged about the rotating shaft Z and are fixedly to the rotating shaft Z via connecting mechanisms 47. A direction of light emitted by the light-emitting diodes 47 is in parallel with a length direction of the rotating shaft Z (the two directions are perpendicular to the paper plane). When the rotating shaft Z rotates along its axis, the light-emitting diode 411 does not move, and light emitted by the light-emitting diode 411 may transmit through different color filter plates to emit light of different light colors. It should be noted that the light-emitting component 41 may further have other structure and this will not limited in the embodiment of the present disclosure.

The light-emitting component 41 may control the color filter plate 412 and the light-emitting diode 411 based on the environment information acquired by the environment information acquisition component 42, so as to make the light-emitting component 41 to emit light in compliance with the target light parameter. For example, the light-emitting diode 411 may change the color temperature of light and the light-emitting power, and the color filter plate 412 may change the light color of the light.

It should be noted that, according to the lighting device in some embodiments of the present disclosure, the target light parameter is acquired based on the sound information of the about environment of the lighting device, and the lighting device is controlled to emit light corresponding to the target light parameter, so that the lighting device can change the light parameter of light emitted based on the sound information of the about environment.

It should be noted that, according to the lighting device in some embodiments of the present disclosure, the target light parameter is acquired based on the sound information of the about environment of the lighting device, and the lighting device is controlled to emit light corresponding to the target light parameter, so that the lighting device can change the light parameter of light emitted based on the sound information of the about environment.

From the above, according to the lighting device provided in some embodiments of the present disclosure, by acquiring environment information about the lighting device and automatically changing the light parameter of light emitted by the lighting device based on the environment information, the problem in the related art, namely the process of changing the color of the light is too complicated, is solved, so that the lighting device can automatically change the light parameter based on the environment information.

For the device in the embodiment, the specific manners in which the respective components thereof perform operations have already been described in detail in the embodiments about the method, and will not be described herein in detail again.

The foregoing is only preferred embodiments of the present disclosure and is not intended to limit the present disclosure. Any modification, equivalent switching, or improvement made within the spirit and principles of the present disclosure should be included in the scope of the present disclosure for protection.

What is claimed is:

1. A lighting method, comprising:
acquiring environment information about a lighting device, wherein the environment information indicates environment features about the lighting device;
acquiring a target light parameter corresponding to the environment information about the lighting device based on a predetermined correspondence between environment information and light parameters, wherein the target light parameter comprises at least one of light color, color temperature and light-emitting power; and
controlling the lighting device to emit light based on the target light parameter;
wherein the lighting device comprises a light-emitting component and an environment information acquisition component;
wherein the light-emitting component is electrically connected to the environment information acquisition component, the environment information acquisition component is configured to acquire the environment information about the lighting device, wherein the environment information indicates the environment features about the lighting device;
wherein the light-emitting component is configured to emit light corresponding to the target light parameter based on the predetermined correspondence between the environment information and the light parameters, wherein the light parameter comprises at least one of light color, color temperature and light-emitting power;
wherein the lighting device further comprises a support and a base;
wherein the support is arranged on the base;
wherein the light-emitting component and the environment information acquisition component are arranged on the support;
wherein a rotating component is arranged on the support, configured to drive the light-emitting component to rotate.

2. The method according to claim 1, wherein the environment information comprises image information, the predetermined correspondence between environment information and light parameters comprises a predetermined correspondence between hues and light parameters, and
the step of acquiring a target light parameter corresponding to the environment information about the lighting device based on a predetermined correspondence between environment information and light parameters comprises:
acquiring a hue of the image information; and
acquiring a target light parameter corresponding to the hue based on the predetermined correspondence between hues and light parameters.

3. The method according to claim 1, wherein the environment information comprises sound information, the predetermined correspondence between environment information and light parameters comprises a predetermined correspondence between timbres and light parameters, and the step of acquiring a target light parameter corresponding to the environment information about the lighting device based on a predetermined correspondence between environment information and light parameters comprises:
acquiring a timbre of the sound information; and
acquiring a target light parameter corresponding to the timbre based on the predetermined correspondence between timbres and light parameters.

4. A lighting device, comprising: a light-emitting component and an environment information acquisition component; a support and a base; wherein the light-emitting component is electrically connected to the environment information acquisition component, the environment information acquisition component is configured to acquire environment information about the lighting device, wherein the environment information indicates environment features about the lighting device; wherein the light-emitting component is configured to emit light corresponding to a target light parameter based on a predetermined correspondence between environment information and light parameters, wherein the target light parameter comprises at least one of light color, color temperature and light-emitting power, wherein the support is arranged on the base; wherein the light-emitting component and the environment information acquisition component are arranged on the support; and wherein a rotating component is arranged on the support, configured to drive the light-emitting component to rotate.

5. The lighting device according to claim 4, wherein
the environment information acquisition component comprises an image acquisition apparatus configured to acquire image information about the lighting device.

6. The lighting device according to claim 5, wherein the image acquisition apparatus is a camera.

7. The lighting device according to claim 6, wherein the light-emitting component comprises light-emitting diodes and a color filter plate, wherein light emitted by the light-emitting component is light emitted by the light-emitting diodes and transmitting through the color filter plate.

8. The lighting device according to claim 5, wherein the light-emitting component comprises light-emitting diodes and a color filter plate, wherein light emitted by the light-emitting component is light emitted by the light-emitting diodes and transmitting through the color filter plate.

9. The lighting device according to claim 4, wherein
the environment information acquisition component comprises a sound acquisition apparatus configured to acquire sound information about the lighting device.

10. The lighting device according to claim 9, wherein the sound acquisition apparatus is a microphone.

11. The lighting device according to claim 9, wherein the light-emitting component comprises light-emitting diodes and a color filter plate, wherein light emitted by the light-emitting component is light emitted by the light-emitting diodes and transmitting through the color filter plate.

12. The lighting device according to claim 4, wherein the light-emitting component comprises light-emitting diodes and a color filter plate, wherein light emitted by the light-emitting component is light emitted by the light-emitting diodes and transmitting through the color filter plate.

13. The lighting device according to claim 12, wherein
the light-emitting component further comprises a switching component; and
the color filter plate comprises a plurality of color filter sub-plates of different colors arranged on the switching component.

14. The lighting device according to claim 13, wherein the switching component comprises a rotating shaft, the color filter sub-plates of different colors are arranged about the rotating shaft, and each of the color filter sub-plates is connected to the rotating shaft via a connecting mechanism; and
- a direction of the light emitted by the light-emitting diode is in parallel with a length direction of the rotating shaft.

15. The lighting device according to claim 12, wherein the light-emitting component further comprises a lamp plate, and the light-emitting diodes are arranged on the lamp plate.

16. The lighting device according to claim 15, wherein the lamp plate is an aluminium-based plate.

17. The lighting device according to claim 12, wherein the color filter plate is a colored glass plate.

18. The lighting device according to claim 4, wherein the support comprises a first part and a second part;
- the light-emitting component is arranged on the first part of the support, and the base is arranged on the second part of the support;
- the first part of the support is rotatably connected to the second part thereof via the rotating component.

* * * * *